(12) United States Patent
Vogel

(10) Patent No.: US 7,626,939 B1
(45) Date of Patent: Dec. 1, 2009

(54) METHOD AND APPARATUS FOR AUTOMATED TIME-BASED PEER-TO-PEER THRESHOLDING

(75) Inventor: Howard Vogel, West Cornwall, CT (US)

(73) Assignee: EMC Corporation, Hopkinton, MA (US)

( * ) Notice: Subject to any disclaimer, the term of this patent is extended or adjusted under 35 U.S.C. 154(b) by 933 days.

(21) Appl. No.: 11/130,042

(22) Filed: May 16, 2005

(51) Int. Cl.
*H04J 1/16* (2006.01)
*G06F 15/173* (2006.01)

(52) U.S. Cl. ...................... 370/252; 709/224
(58) Field of Classification Search ................ 370/252, 370/241; 709/223, 224
See application file for complete search history.

(56) References Cited

U.S. PATENT DOCUMENTS

| | | | |
|---|---|---|---|
| 6,842,620 B2 * | 1/2005 | Smith et al. | 455/456.1 |
| 7,054,822 B2 * | 5/2006 | McCall | 705/1 |
| 7,069,177 B2 * | 6/2006 | Carley | 702/179 |
| 7,149,188 B2 * | 12/2006 | Wilson | 370/235 |
| 7,398,309 B2 * | 7/2008 | Baumann et al. | 709/224 |
| 2003/0135382 A1 * | 7/2003 | Marejka et al. | 705/1 |

* cited by examiner

*Primary Examiner*—Nittaya Juntima
(74) *Attorney, Agent, or Firm*—Krishnendu Gupta; Joseph D'Angelo

(57) ABSTRACT

A method and apparatus for determining the performance of components of a distributed network is disclosed. The method comprises the steps of determining for each of the components, a range as a function of a time-based parameter associated with the components and a known tolerance value, wherein the value of the parameter associated with one selected component is excluded from the determination and determining whether the value of the parameter associated with the excluded component is within the determined range.

29 Claims, 6 Drawing Sheets

//  METHOD AND APPARATUS FOR AUTOMATED TIME-BASED PEER-TO-PEER THRESHOLDING

RELATED APPLICATION

This application is related to commonly-owned, concurrently filed U.S. patent application Ser. No. 11/130,046, entitled "Method and Apparatus for Automated Content-Based Peer-to-Peer Thresholding," the contents of which are incorporated by reference herein.

FIELD OF THE INVENTION

This application relates to the field of distributed systems and more specifically with a method and apparatus determining network component performance using time-based peer-to-peer comparison.

BACKGROUND OF THE INVENTION

The use of computer networks has become an integral part of the way businesses provide goods and services to their customers. One advantage the use of the network provides is to enable the distribution of applications and the business logic that they are comprised of closer to the actual user, or customer. This enables these businesses to offer higher levels of service to disparate groups of customers in a wider geographic area than ever before. This opportunity has also enabled to businesses to allow customers access to the network, albeit limited, for example, to directly track their purchases. In this case, each customer may have access to standardized or "tailored" application software packages or to custom developed software packages, to perform desired operations.

As the networks continue to expand in size and utilization, it becomes important that the network be operating properly. For example, timely response to a user request is an important factor in determining whether network components and, consequentially, the network is operating properly. In another aspect, timely completion of a user requested transaction may determine whether the overall system (software and hardware) are operating properly or at least satisfactorily.

However, it is often difficult to determine whether timely responses are monitoring or measuring the execution time and comparing the execution time to a known value, i.e, a threshold. If the execution time is greater that the selected threshold, then the response is considered untimely and an indication is provided to determine the reason for the untimely response. In another aspect, the threshold value may be determined as an average value of a plurality of measured execution times accumulated over a pre-set sample window. In still another aspect, the threshold value may be based on a rolling baseline as an average value of a plurality of measured execution times accumulated over a pre-set time sample window and the window is adjusted by removing the oldest values when adding newer values.

However, convention methods fail to allow for the introduction of network capacity and duress, i.e., load. A static threshold value uses only a single non-changing value which may not bet scalable when a time criterion of network usage is considered. A time based rolling baseline threshold method fails to consider that the time window size is fixed and may not consider additional or reduction in network load. Further this method relies on historical data, is dependent upon the size of the window, and is not performed in real-time. The rolling baseline fails to consider the addition or reduction in load and, although the values within the window change with time, the size of the window affects the threshold value. That is, the smaller the window size the closer the threshold is to the data being measured. But this smaller window comes at the cost of the benefit of processing time and the benefit of averaging the data over a smaller time window.

Hence, there is a need in the industry for a method and apparatus for providing determining network component operation in real-time and adaptive to changes in the network.

SUMMARY OF THE INVENTION

A method and apparatus for determining the performance of a components of a distributed network is disclosed. The method comprises the steps of determining for each of the components, a range as a function of a time-based parameter associated with the components and a known tolerance value, wherein the value of the parameter associated with one selected component is excluded from the determination and determining whether the value of the parameter associated with the excluded component is within the determined range.

Figure 1:
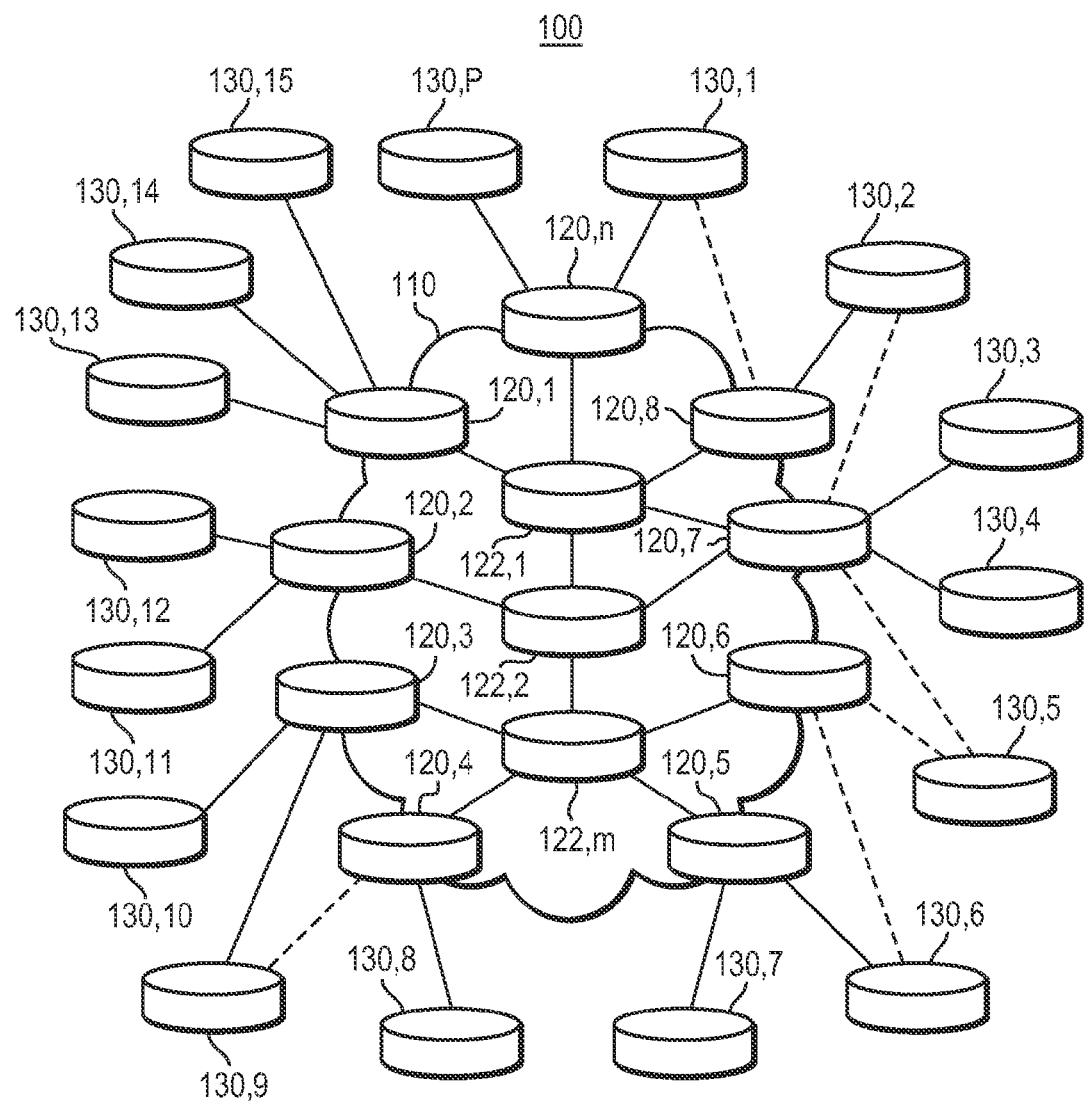
FIG. 1 illustrates a conventional network configuration.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

FIG. 1 illustrates a conventional enterprise network configuration 100 including multi-tier network 110 through which a network owner, e.g., a manufacturer, retailer or provider of services, may construct to enable users to communicate with the network owner. In this illustrated configuration, network 110, which may represent a public network, such as the Internet, that provides a communication linkage between the network owner's edge servers 120.1-120.$n$ and routers 122.1-122.$m$ components or elements. Edge server components 120-1-120.$n$ provide a means for communicating between users, represented as nodes 130.1-130.$p$, and the information or content contained on the network owners internal server or router components. 122.1-122.$m$ Although not shown, it would be recognized that network configuration 100 may further include a plurality of load balancer components or elements to balance the traffic load between the edge routers 120.1-120.$n$ and routers 122.1-

122.*m*. Also not shown are data bases that may be in communication, via load balancers or switches, to each of the network owners routers or server components 122.1-122.*m*. The database components may be used to store information regarding the owner's business and practice. This information may include, for example, inventory, invoices, credit card numbers, sales, transactions, user personal identification, etc.

Typically, users 130.1-130.*p* communicate with one or another of the edge servers component 120.1-120.*n*. For example, user 130.1 may access the owner's network 110 via edge server component 120.*n*, as represented by the solid line, or via edge server component 120.1, represented by the dashed line. The selection of one edge server over another may be determined based on factors such as the communication medium, edge server load, etc. Such factors are known and need not be discussed in detail herein.

Figure 2A:
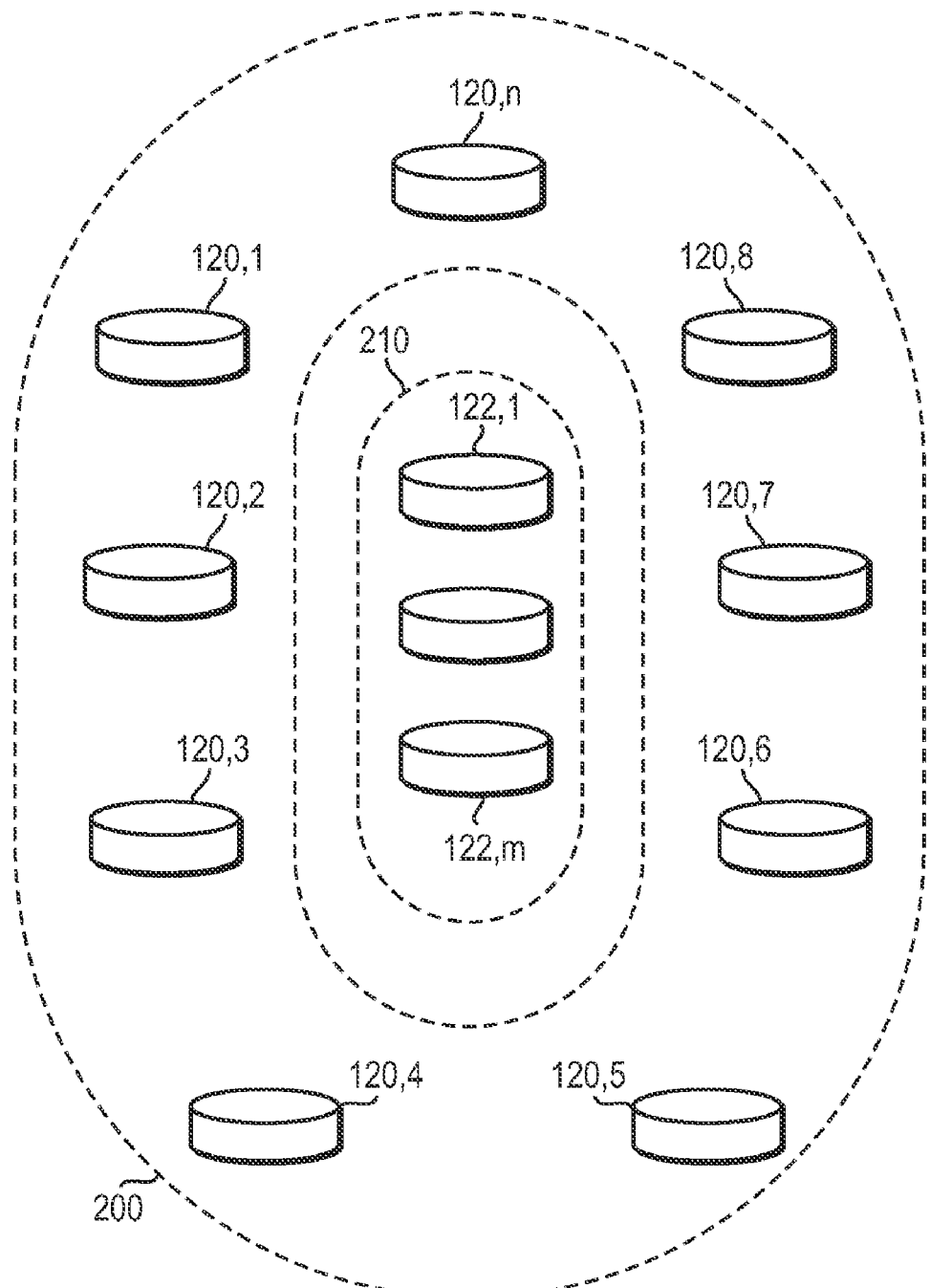
FIG. 2A illustrates a first formulation of a redundancy group in accordance with the principles of the invention.

FIG. 2A illustrates an example of the formation of redundancy groups wherein network components, having substantially the same properties or attributes, are represented as a single entity, in accordance with the principles of the invention as shown, the edge server component shown in FIG. 1 are represented as a single redundancy group 200 as they exhibit substantially the same properties or attributes. Similarly, the router components are represented as a single redundancy group 210 as they exhibit substantially the same properties or attributes. Similar redundancy groups may be formulated for the not shown load balancers and data bases network elements.

Figure 2B:
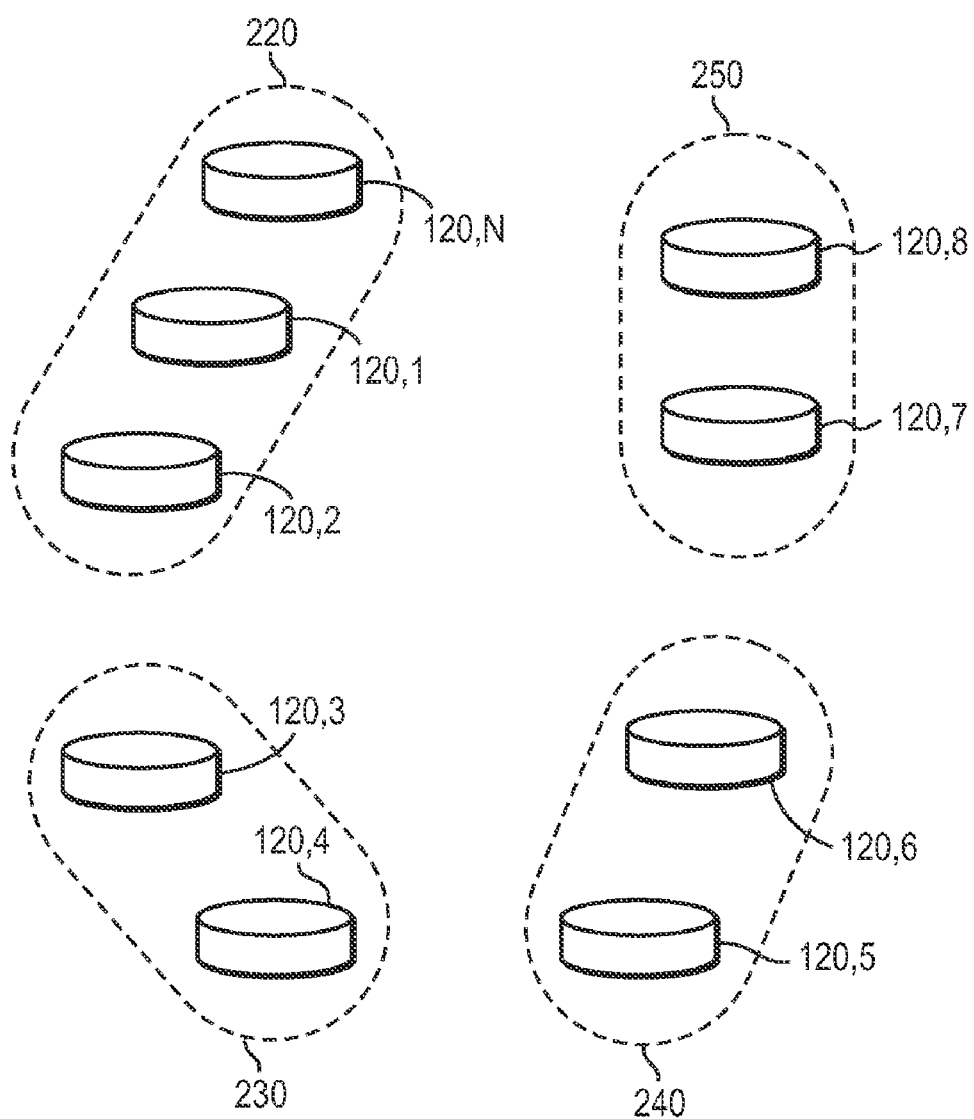
FIG. 2B illustrates a second formulation of a redundancy group in accordance with the principles of the invention.

FIG. 2B illustrates a second example of the formation of redundancy groups wherein the edge servers, shown in FIG. 1, are assigned to different redundancy group based, for example, on the additional similar property; geographic location. In this case, the location is a selected as a differentiating property that is not exhibited by each of the edge server components. Hence, in this second example, servers 120.3 and 120.4 are assigned to redundancy group 230 whereas servers 120.7 and 120.8 are assigned to redundancy group 250. Additional differentiating properties may be selected from the group consisting of type of equipment, type of communication, level of application residing on the equipment, etc. Each of these factors may be used to create redundancy groups of common properties or attributes.

Figure 3:
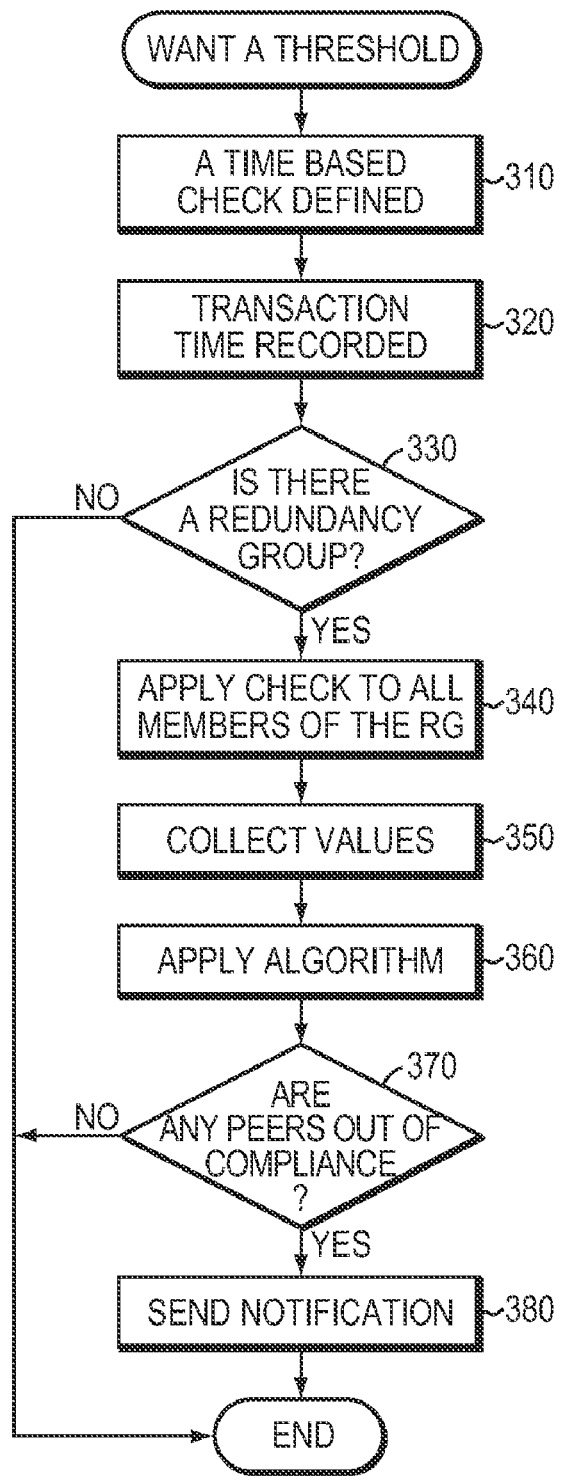
FIG. 3 illustrates an exemplary process for peer-to-peer comparison in accordance with the principles of the invention.

FIG. 3 illustrates an exemplary process for determining whether the elements of a redundancy group are operating within expected operating characteristics. In this exemplary process, a type of time-based parameter is selected or time-based determination is defined at block 310. For example, a time-based determination may be a time for a sample or typical action or transaction or may be the time to respond to a known request. Such time-base determinations are well-known and conventionally referred to as a "time-baseline." At block 320, assuming that a transaction time is determined, the transaction is executed and a transaction time is recorded. At block 330, a determination is made whether a redundancy group is available. If the answer is negative, then the exemplary processing shown is ended.

However, if the answer is in the affirmative, then a selected operation or check is performed on each of the members of a selected redundancy group at block 340. At block 350, time-based parameter values associated with each member of the redundancy group are collected for the action executed. At block 360, the collected time-based parameters values are subjected to an algorithm associated with the selected parameter. At block 370, a determination is made whether any elements of the selected redundancy group are outside a determined tolerance range for the selected time-based parameter. If the answer is negative, then the exemplary process is completed.

However, if the answer is in the affirmative, then a notification that at least one of the elements of the redundancy group is out of compliance or tolerance with the other members of the redundancy group is provided at block 380.

Figure 4:
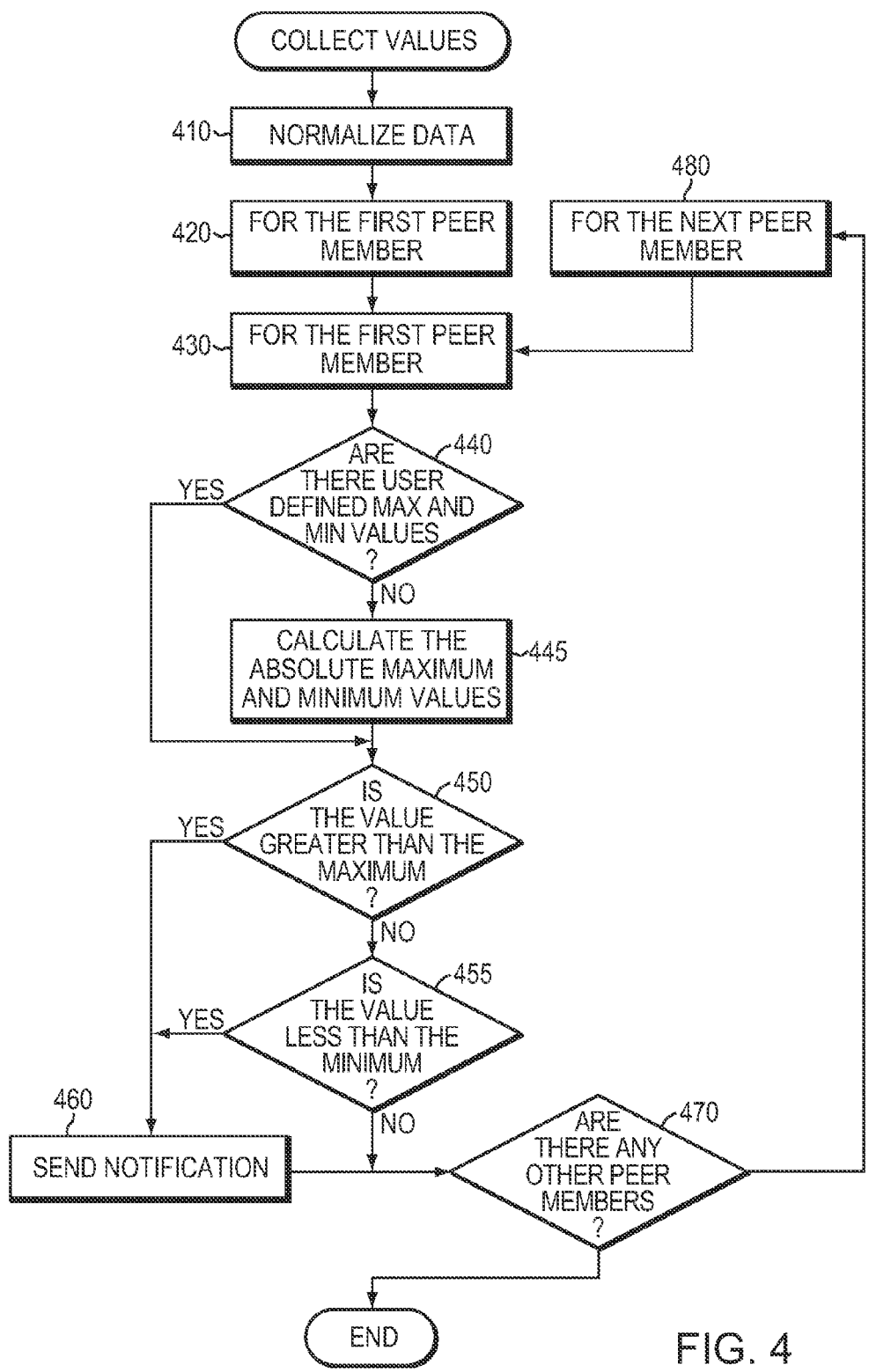
FIG. 4 illustrates an exemplary process for determining time-based peer-to-peer threshold values for the process shown in FIG. 3.

FIG. 4 illustrates an exemplary process for determining time-based peer-to-peer threshold values in accordance with the principles of the invention. In this exemplary process, the collected data values, from block 350, FIG. 3, are normalized to account for any known differences that may be introduced in the network. For example, in the case of a time to respond to a request, the distance between the servers and the routers or the number of servers traversed may introduce a time delay that may be removed to properly measure the time to respond. Similarly, the time-delay may be introduced by the type of communication medium, e.g., optical fiber, copper wire, etc., or the communication medium, e.g., broadband, dial-up etc.

At block 420, a first member of the redundancy group is selected and a value associated with the selected member is retained. At block 430, a measured parameter based on the values associated with the remaining members of the redundancy group is determined. In a preferred embodiment, the measured parameter is an average value of the time-based values associated with the remaining members of the redundancy group.

At block 440, a determination is made whether user-defined maximum and minimum values are available. If the answer is negative, then maximum and minimum values are determined at block 445 from the measured parameter.

At block 450, a determination is made whether the value of the selected member of the redundancy group is greater than the maximum value. If the answer is negative, then a determination is made at block 455, whether the value of the selected member is less than the minimum value. If the answer is negative then a determination is made at block 470 whether any members are remaining to be tested in the redundancy group. If the answer is in the affirmative, then a next member of the redundancy group is selected at block 480 and the process is executed for the next selected member.

However, if the value of the selected member or element is greater than (or greater than or equal) or less than (or less than or equal) to the maximum or minimum value, at blocks 450 and 455, respectively, then a notification is prepared at block 460.

Referring to block 445, in one aspect of the invention, the maximum and minimum values may be determined as:

$$\max, \min(C_j) = \sum_{\substack{i=1 \\ i \neq j}}^{n} \frac{C_i}{n-1} \pm \text{tolerance} \qquad [1]$$

where $C_j$ is the current member; a $C_i$ represents the remaining members.

The determined maximum and minimum values, i.e. range, are used to determine whether the value of the excluded element ($C_j$) is within tolerance of the other elements, or its peers, in the redundancy group.

As an example of the processing shown in equation 1, assume a redundancy group consisting of $\{C_1, C_2, C_3, C_4, C_5, C_6\}$ having normalized values of $\{3, 5, 7, 9, 6, 7\}$, maximum and minimum values may be determined as shown in Table 1, wherein the tolerance value is selected as a known or fixed value, i.e., one unit.

TABLE 1

| Member | Remain. Members | Average Value | Minimum | Maximum |
|---|---|---|---|---|
| C1 | $C_2$-$C_6$ | 6.8 | 5.8 | 7.8 |
| C2 | C1, C3-C6 | 6.6 | 5.6 | 7.6 |
| C3 | C1, C2, C4-C6 | 6.0 | 5.0 | 7.0 |
| C4 | C1-C3, C5-C6 | 5.6 | 4.6 | 6.6 |
| C5 | C1-C4, C6 | 6.2 | 5.2 | 7.2 |
| C6 | C1-C5 | 6.0 | 5.0 | 7.0 |

In this illustrated example, the values of members $C_1$ and $C_4$ may be determined to be outside their respective ranges and, hence, a notification is provided for each of these components or elements. Similarly, components $C_3$ and $C_6$ may also be determined to be outside the range as they are equal to the maximum value. Hence, notification messages may be provided for these components. In one aspect of the invention, a notification message may be delayed, until more than one occurrence of this endpoint condition is detected.

In another aspect of the invention, the minimum and maximum values may be determined based on the maximum and minimum of each of the average values. In this case, the maximum and minimum values may be determined as 7.8 and 4.6, respectively, again using a tolerance value of one unit. In this case, members $C_1$ and $C_4$ may be determined to be outside the allowable range.

In still another aspect of the invention, the minimum and maximum values may be determined based on a histogram of the actual values or of the average values. In this aspect of the invention, extreme values, i.e., 3 and 9 referring to Table 1, may be removed from further operations and an a value determined among the remaining values. In this case, an the value may be determined as an average of the remaining values, i.e., 6.25, and a maximum and minimum value may be determined as 5.25 and 7.25,again using a tolerance value of one unit. In this case, members $C_1$ and $C_4$ are determined to be outside the determined range and, hence, alert or notification messages are provided for each of these components.

In still another aspect, the average of the average values may be determined and minimum and maximum values determined from this average of average values. In this aspect, the maximum and minimum values may be determined, for example, as 7.2 and 5.2, respectively, again using the one unit tolerance value, wherein the average of the average values shown in Table 1 is 6.2. In this case, members $C_1$ and $C_4$ remain outside the determined range and, hence, alerts are provided for these members.

Although the present invention has been shown with regard to an average value, it would be recognized that similar functions, such as a square, a mean square, etc., may be employed and are considered within the scope of the invention. Similarly, while a fixed tolerance value has been used to illustrate the principles of the invention, it would be recognized that the tolerance value may be selected as a fixed or variable percentage of the values being processed. Similarly, the tolerance value may be dynamically determined based on measured, expected or desired characteristic of the distributed system. For example, an action may be expected to be completed within a fixed time; hence, the tolerance value may be determined based on this fixed time.

Figure 5:
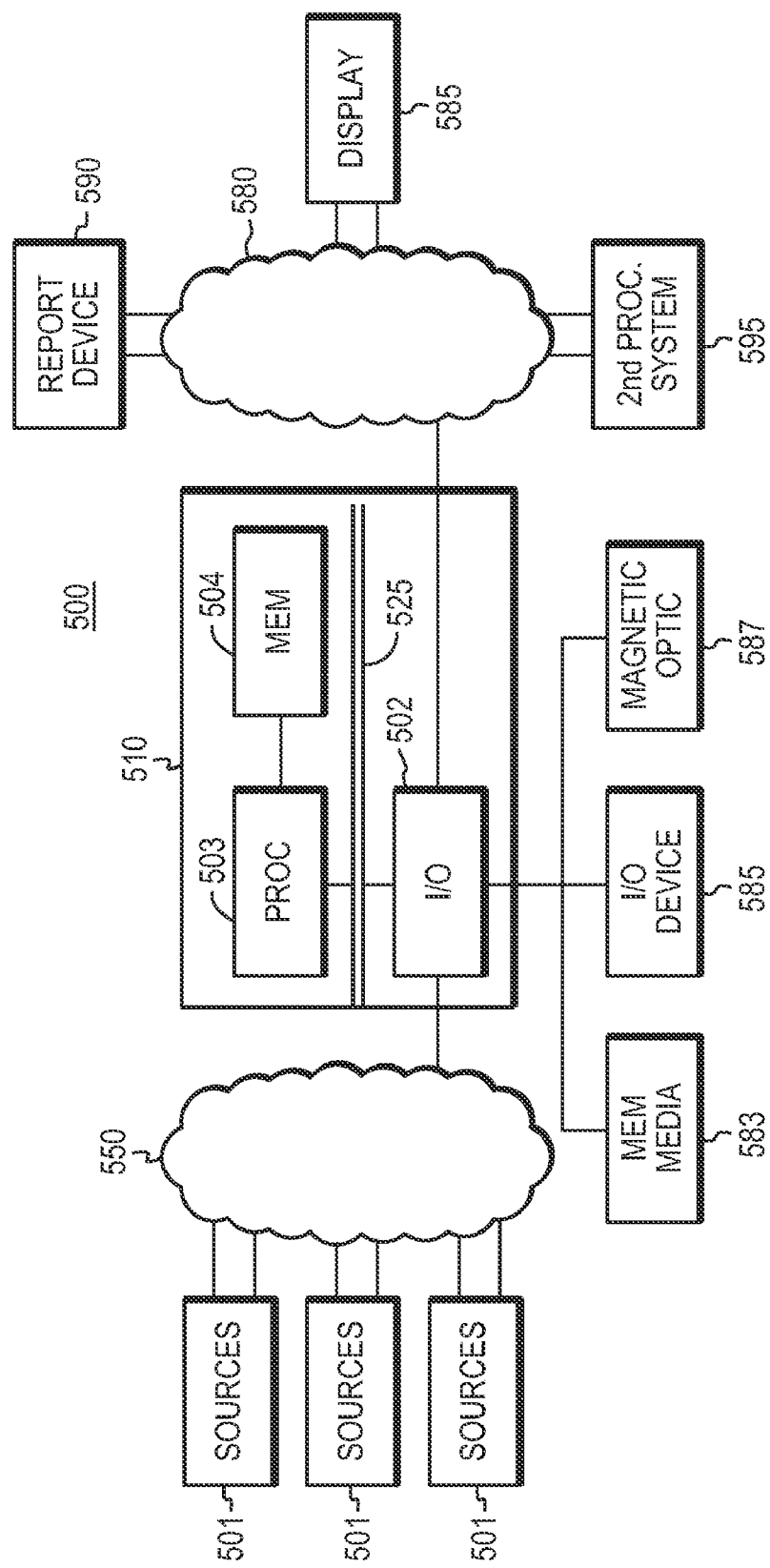
FIG. 5 illustrates an exemplary apparatus for implementing the processing shown herein.

FIG. 5 illustrates an exemplary embodiment of a system 500 that may be used for implementing the principles of the present invention. System 500 may contain one or more input/output devices 502, processors 503 and memories 504. I/O devices 502 may access or receive information from one or more sources or devices 501. Sources or devices 501 may be devices such as routers, servers, computers, notebook computer, PDAs, cells phones or other devices suitable for transmitting and receiving information responsive to the processes shown herein. Devices 501 may have access to device 510 over one or more network connections 550 via, for example, a wireless wide area network, a wireless metropolitan area network, a wireless local area network, a terrestrial broadcast system (Radio, TV), a satellite network, a cell phone or a wireless telephone network, or similar wired networks, such as POTS, Internet, LAN, WAN and/or private networks, e.g., Intranet, as well as portions or combinations of these and other types of networks.

Input/output devices 502, processors 503 and memories 504 may communicate over a communication network 525. Communication network 525 may represent, for example, a bus, a communication network, one or more internal connections of a circuit, circuit card or other apparatus, as well as portions and combinations of these and other communication media. Input data from the client devices 501 is processed in accordance with one or more programs that may be stored in memories 504 and executed by processors 503. Memories 504 may be any magnetic, optical or semiconductor medium that is loadable and retains information either permanently, e.g. PROM, or non-permanently, e.g., RAM. Processors 503 may be any means, such as general purpose or special purpose computing system, such as a laptop computer, desktop computer, a server, handheld computer, or may be a hardware configuration, such as dedicated logic circuit, or integrated circuit. Processors 503 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on a computer readable medium. The computer readable medium does not include carrier wave or signal. The code may also be stored in the memory 504. The code may be read or downloaded from a memory medium 583, an I/O device 585 or magnetic or optical media, such as a floppy disk, a CD-ROM or a DVD, 587 and then stored in memory 504. In addition, the code may be transferred electronically over one or more networks, e.g., 550, 580, to memory 504. The code may be either computer/processor dependent or computer/processor independent. JAVA is an example of computer/processor independent code. JAVA is a trademark of Sun Microsystems, Inc.

Information from device 501 received by I/O device 502, after processing in accordance with one or more software programs operable to perform the functions illustrated herein, may also be transmitted over network 580 to one or more output devices represented as display 585, reporting device 590 or second processing system 595.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet. In addition, while networks 550 and 580 and communication network 525 are shown as distinct elements it would be recognized that these networks may be the same or different networks and may operate on the same or different communication principles or protocols.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method comprising:
   using a processor to communicate with a component of a group of components to determine a parameter, wherein the group of components is part of a distributed network;
   determining for each of components of the group of components, a range as a function of the parameter associated with the components of the group of components and a known tolerance value, wherein the value of the parameter associated with one excluded component of the group of components is excluded from the determination; and
   determining whether the excluded component is operating properly by determining whether the value of the parameter associated with the excluded component is within the determined range.

2. The method as recited in claim 1, further comprising the step of:
   providing an indication by sending a notification to a device, when the parameter value associated with the excluded component is outside the determined range.

3. The method as recited in claim 1, wherein the parameter is a time-based parameter.

4. The method as recited in claim 3, wherein the time-based parameter represents a time to respond to a request.

5. The method as recited in claim 4, wherein the time-based parameter represents a time to complete an action.

6. The method as recited in claim 1, further comprising the step of:
   grouping the components of the distributed network based on at least one common attribute.

7. The method as recited in claim 1, further comprising the step of:
   normalizing the value of the parameter associated with each of the components.

8. The method as recited in claim 1, wherein the step of determining a range further comprises the step of:
   specifying a tolerance range as a maximum of each of the determined range maximums and a minimum of each of the determined range minimums.

9. The method as recited in claim 1, wherein the step of determining a range further comprises the step of:
   excluding the highest and lowest parameter values.

10. An apparatus for determining the performance of one or more components of a distributed network, the apparatus comprising:
    a processor in communication with a memory, the processor executing code for:
       determining for each components of the one or more components, a range as a function of a parameter associated with the components and a known tolerance value, wherein the value of the parameter associated with one excluded component is excluded from the determination; and
       determining whether the excluded component is operating properly by determining whether the value of the parameter associated with the excluded component is within the determined range.

11. The apparatus as recited in claim 10, the processor further executing code for:
    providing an indication by sending a notification to a device, when the parameter value associated with the excluded component is outside the determined range.

12. The apparatus as recited in claim 10 wherein the parameter, which is selected, is a time-based parameter.

13. The apparatus as recited in claim 10, the processor further executing code for:
    grouping the components of the distributed network based on at least one common attribute.

14. The apparatus as recited in claim 10, the processor further executing code for:
    normalizing the value of the parameter associated with each of the components.

15. The apparatus as recited in claim 10, the processor further executing code for:
    specifying a tolerance range as a maximum of each of the determined range maximums and a minimum of each of the determined range minimums.

16. The apparatus as recited in claim 10, further comprising:
    an input/output device, in communication with the processor.

17. The apparatus as recited in claim 10, wherein the code is stored in the memory.

18. A computer readable medium providing computer executable code to a computing system, where the code is providing instruction to the computing system for:
    determining for each component of a distributed network, a range as a function of a parameter associated with each component of the distributed network and a known tolerance value, wherein the value of the parameter associated with one excluded component of the distributed network is excluded from the determination; and
    determining whether the excluded component is operating properly by determining whether the value of the parameter associated with the excluded component is within the determined range.

19. The medium as recited in claim 18, the code further providing instruction to the computing system for:
    providing an indication by sending a notification to a device, when the parameter value associated with the excluded component is outside the determined range.

20. The medium as recited in claim 8 wherein the parameter, which is selected, is a time-based parameter.

21. The medium as recited in claim 8, wherein the time-based parameter represents a time to respond to a request.

22. The medium as recited in claim 8, wherein the time-based parameter represents a time to complete an action.

23. The medium as recited in claim 8, the code further providing instruction to the computing system for:
    grouping the components of the distributed network based on at least one common attribute.

24. The medium as recited in claim 8, the code further providing instruction to the computing system for:
  normalizing the value of the parameter associated with each of the components.

25. The medium as recited in claim 8, the code further providing instruction to the computing system for:
  specifying a tolerance range as a maximum of each of the determined range maximums and a minimum of each of the determined range minimums.

26. The medium as recited in claim 18, the code further providing instruction to the computing system for:
  excluding the highest and lowest parameter values.

27. An apparatus for determining the performance of components of a distributed network, the apparatus comprising:
  a processor in communication with a memory, the processor executing code for:
    determining for each of the components, a range as a function of a parameter associated with the components and a known tolerance value, wherein the value of the parameter associated with one excluded component is excluded from the determination; and
    determining whether the excluded component is operating properly by determining whether the value of the parameter associated with the excluded component is within the determined range; and
    wherein the parameter associated with the components represents a time to respond to a request.

28. An apparatus for determining the performance of components of a distributed network, the apparatus comprising:
  a processor in communication with a memory, the processor executing code for:
    determining for each of the components, a range as a function of a parameter associated with the components and a known tolerance value, wherein the value of the parameter associated with one excluded component is excluded from the determination; and
    determining whether the excluded component is operating properly by determining whether the value of the parameter associated with the excluded component is within the determined range; and
    wherein the parameter associated with the components represents a time to complete an action.

29. An apparatus for determining the performance of components of a distributed network, the apparatus comprising:
  a processor in communication with a memory, the processor executing code for:
    determining for each of the components, a range as a function of a parameter associated with the components and a known tolerance value, wherein the value of the parameter associated with one excluded component is excluded from the determination;
    determining whether the excluded component is operating properly by determining whether the value of the parameter associated with the excluded component is within the determined range;
    excluding the highest and lowest parameter values.

\* \* \* \* \*